United States Patent
Ito et al.

(10) Patent No.: US 7,120,267 B2
(45) Date of Patent: Oct. 10, 2006

(54) HEADSET

(75) Inventors: Tomohiro Ito, Kanagawa (JP); Ikuo Shinohara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/499,296

(22) PCT Filed: Dec. 16, 2002

(86) PCT No.: PCT/JP02/13126
§ 371 (c)(1),
(2), (4) Date: Jun. 15, 2004

(87) PCT Pub. No.: WO03/053096
PCT Pub. Date: Jun. 26, 2003

(65) Prior Publication Data
US 2005/0008184 A1    Jan. 13, 2005

(30) Foreign Application Priority Data
Dec. 18, 2001 (JP) .............................. 2001-384951

(51) Int. Cl.
*H04R 25/00* (2006.01)
(52) U.S. Cl. ...................... 381/375; 381/370; 381/371; 381/384
(58) Field of Classification Search ................ 381/362, 381/363, 366, 367, 375, 371, 382, 390, 376, 381/372, 361, 365, 370, 381, 384; 379/430, 379/438; 455/575.2, 66.1, 569.1, 351; 181/20, 181/21, 22, 128; 242/378, 378.1, 378.2, 242/378.3, 381.3; 439/501
See application file for complete search history.

(56) References Cited

U.S. PATENT DOCUMENTS

| | | | | | |
|---|---|---|---|---|---|
| 4,020,297 | A | * | 4/1977 | Brodie | 379/430 |
| 4,882,745 | A | * | 11/1989 | Silver | 455/575.2 |
| 5,339,461 | A | * | 8/1994 | Luplow | 455/351 |
| 6,055,312 | A | * | 4/2000 | Pralus et al. | 379/430 |
| 6,178,251 | B1 | * | 1/2001 | Luchs et al. | 381/364 |
| 6,269,259 | B1 | * | 7/2001 | Lai | 455/569.1 |
| 2002/0197961 | A1 | * | 12/2002 | Warren | 455/66 |
| 2003/0003969 | A1 | * | 1/2003 | Tong et al. | 455/568 |
| 2003/0060241 | A1 | * | 3/2003 | Loprete | 455/568 |
| 2004/0125977 | A1 | * | 7/2004 | Hong et al. | 381/376 |

FOREIGN PATENT DOCUMENTS

| | | |
|---|---|---|
| JP | 57-51387 | 3/1982 |
| JP | 59-125187 | 8/1984 |
| JP | 8-293906 A | 11/1996 |

* cited by examiner

*Primary Examiner*—Huyen Le
(74) *Attorney, Agent, or Firm*—Wolf, Greenfield & Sacks, P.C.

(57) ABSTRACT

A headset of the present invention includes: a housing 10 worn on one auricle of a wearer; an arm 41 having a predetermined length, one end side of which is accommodated in the housing and the other end side of which is pulled out of a hole 13a of the housing to the outside, accommodated in the housing by adjusting the length pulled out of the hole 13a of the housing to the outside; and a microphone attached to the arm 41. When the headset is being used, the end of the arm 41 comes close to the wearer's mouth by pulling the arm 41 out of the housing 10. When the microphone need not be used, the arm 41 is stored in the housing 10 so as not to protrude from the housing 10.

12 Claims, 11 Drawing Sheets

HEADSET

TECHNICAL FIELD

The present invention relates to a headset which is worn on a user's head, for example, a headset which is connected to communication equipment such as a mobile-phone unit.

BACKGROUND ART

As headsets which are worn on users' heads, conventionally there have been various forms of headsets put into practical use. For example, there is a headset having the shape shown in FIG. 1. This headset shown in FIG. 1 is constructed such that a driver unit which outputs a sound according to a provided sound signal is incorporated in both a left housing 1 and a right housing 2, and both the housings 1 and 2 are connected by a band 3 to form headphones. When a user puts on this headset, the housings 1 and 2 are each worn on the user's left and right auricles by hooking auricle holding portions 3a and 3b of the band 3, which are in the vicinity of portions connected to the housings 1 and 2, to be attached to his/her upper auricles.

Hereupon, an arm 4 is attached to the outside of the left housing 1 by means of a supporting member 5 capable of turning freely, and a microphone 6 is attached to the end of the arm 4. With this construction, when this headset is worn and connected to communication equipment such as a mobile-phone unit, sound received by the communication equipment is output from the left and right housings 1 and 2 and sound picked up by the microphone 6 is transmitted from the communication equipment, so that audio transmission and the like can be executed.

Then, the above conventional headset has a construction in which a microphone is added to headphones, and can also be used as headphones. That is, without using the microphone the headset can be used as headphones equipped with speakers. However, there has been a problem in which while the headset is being used as headphones, the microphone is unnecessary and disturbing to the user. In the case of the headset shown in FIG. 1, for example, the arm 4 to which the microphone 6 is attached can freely turn by means of the supporting member 5. Therefore, when the microphone is not being used, it is likely that the arm 4 to which the microphone 6 is attached will be turned and lifted upward as shown in FIG. 2, for example.

Although the microphone will be away from the wearer's mouth by the lift of the microphone, the microphone still remains extending from the housing 1 and stays in a position unpleasant for the wearer, which is a problem. In order to solve this problem, it is assumed that, for example, a headset has a construction in which an arm, to which a microphone is attached, can be detachable from a housing; however, in that case detaching and attaching the detachable arm takes time and effort, and also requires the user's care not to lose the microphone detached from the housing, so that there occurs a problem in which time and effort is required in handling.

DISCLOSURE OF THE INVENTION

The present invention is made in light of the above situation, and the object of the present invention is to provide a headset to which a microphone is attached and which is convenient both when the microphone is used and is not used.

A headset of a first aspect of the present invention includes: a housing worn on one of the user's auricles, a driver unit which is accommodated in the above described housing and outputs sound corresponding to a provided sound signal, an arm of a predetermined length, one end side of which is accommodated in the housing and the other end side of which is pulled out of a hole of the housing to the outside and is able to be accommodated in the housing by adjusting the length thereof, and a microphone attached to the above described arm.

According to the above construction, the end of the arm comes close to the wearer's mouth by pulling the arm to which the microphone is attached out of the housing and sound emitted by the wearer can be picked up by the microphone, thereby functioning as a favorable headset. Further, when the microphone need not be used, the arm is stored in the housing and does not protrude from the housing, so that the shape of the headset becomes approximately similar to conventional headphones without an attached microphone and user-friendliness and portability are improved, when the arm is stored.

A headset of a second aspect of the present invention is the headset according to the first aspect of the invention, in which the above described arm is formed of a resilient hollow pipe and stored such that the arm is wound around the approximately outermost peripheral part of the above described housing.

According to the above construction, the comparatively long arm can be stored favorably in the housing.

A headset of a third aspect of the present invention is the headset according to the second aspect of the invention, further including:

an arm-attaching member, to which one end of the above described arm is attached inside the above described housing, capable of turning with respect to the above housing, in which the above described arm is wound around the approximately outermost peripheral part in the above housing by turning this arm-attaching member.

According to the above construction, the arm is wound and stored in the housing by, for example, turning the arm-attaching member by the user, so that storage operation of the arm can be performed without difficulties.

A headset of a fourth aspect of the present invention is the headset according to the third aspect of the invention, in which the above described arm-attaching member is connected to the above housing side through a take-up spring, and the above arm is taken-up into the housing by the turning of the above described arm-attaching member with the resilient force of the above take-up spring.

According to the above described construction, the arm can automatically be taken-up, utilizing the resilient force of the spring.

A headset of a fifth aspect of the present invention is the headset according to the fourth aspect of the invention, in which an anti-turning mechanism, which locks the arm-attaching member on the above housing side at a predetermined position where the other end side of the above arm is pulled out to the outside of the above housing, is provided.

According to the above construction, the winding force of the spring is prevented from acting when the arm is pulled out to the predetermined position.

A headset of a sixth aspect of the present invention is the headset according to the second aspect of the invention, in which a guide portion which guides the arm linearly or in the opposite direction to the direction in which the above arm is wound is provided in the vicinity of a hole of the above housing.

According to the above construction, the shape of the arm which extends from the housing is made to be favorable.

A headset of a seventh aspect of the present invention is the headset according to the second aspect of the invention, in which the above described microphone is attached to one end of the above arm attached inside the above housing, a hole is provided at the tip end of the above arm, and the above microphone picks up sounds input from the hole at the end of the arm.

According to the above construction, the tip end side of the arm can be constructed extremely small-sized, the arm protruding from the housing when being used can be small-sized and light-weighted, and the part protruding from the housing is made to be extremely small when the arm is stored, so that the arm is not easily noticed.

A headset of an eighth aspect of the present invention is the headset according to the seventh aspect of the invention, in which a signal line connected to the above described microphone is disposed with a predetermined amount of looseness in the aforementioned housing.

According to the above construction, although the microphone turns concurrently as well when the arm is being taken-up, the signal line can be connected to the microphone without difficulties.

A headset of a ninth aspect of the present invention is the headset according to the second aspect of the invention, in which the above described microphone is attached to the other end of the above arm pulled out of the hole of the above housing to the outside, and a signal line connected to the microphone is disposed inside a hollow arm.

According to the above construction, the wearer's voice is picked up directly by the microphone attached to the tip end of the arm.

A headset of a tenth aspect of the present invention is the headset according to the second aspect of the invention, in which a switch, which mutes the output of the above described microphone when the above arm is being stored in the above housing, is provided.

According to the above construction, the microphone automatically picks up sounds only when the microphone has been pulled out, and there is no need to provide another switch for the microphone.

A headset of an eleventh aspect of the present invention is the headset according to the second aspect of the invention, in which the above described arm is formed of shape-memory alloy and made to have a predetermined shape when pulled out of the above housing.

According to the above construction, the shape of the arm is fixed when the arm is pulled out, so that the arm can be positioned close to the wearer's mouth, for example.

A headset of a twelfth aspect of the present invention is the headset according to the first aspect of the invention, in which the above described arm is stored in the housing approximately linearly from the hole of the above housing.

According to the above construction, the arm can be pulled out and stored by the linear back-and-forth motion.

A headset of a thirteenth aspect of the present invention is the headset according to the first aspect of the invention, in which a second housing which is to be worn on the wearer's other auricle is provided, and in this second housing a driver unit which outputs a sound is provided but neither an arm nor a microphone is provided.

According to the above construction, the shape of headphones provided with two left and right housings can be a headset by attaching a microphone thereto.

A headset of a fourteenth aspect of the present invention is the headset according to the thirteenth aspect of the invention, in which a band for connecting the above described two housings is provided.

According to the above construction, the headset is formed as headphones in which two housings are connected by the band.

BEST MODE OF CARRYING OUT THE INVENTION

Hereinafter, embodiments of the present invention will be described.

Figure 1:
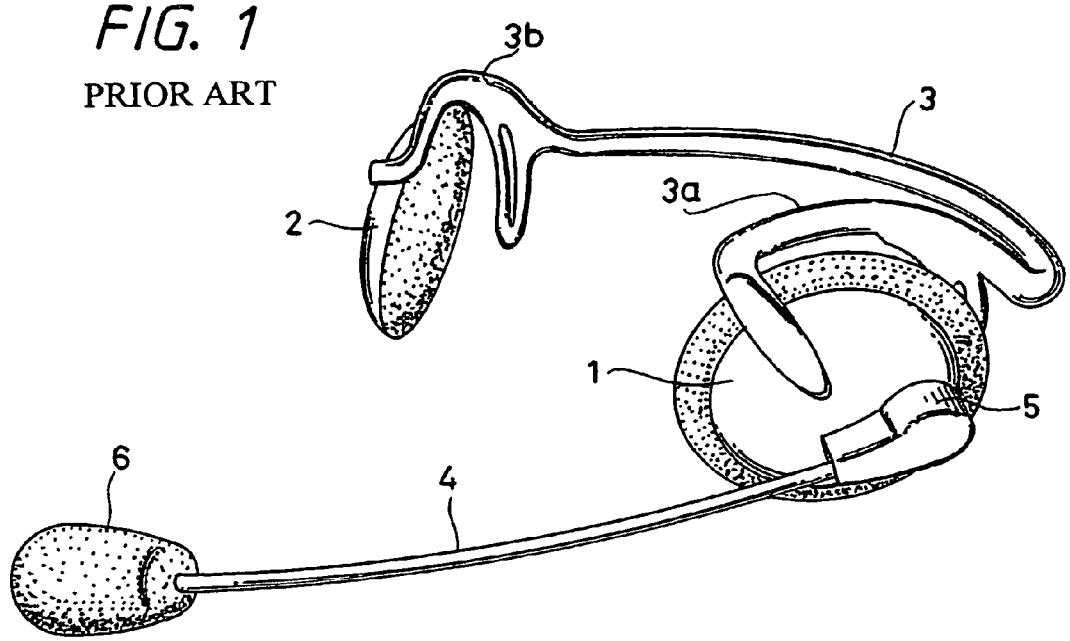
FIG. 1 is a perspective view showing an example of a conventional headset.
Figure 2:
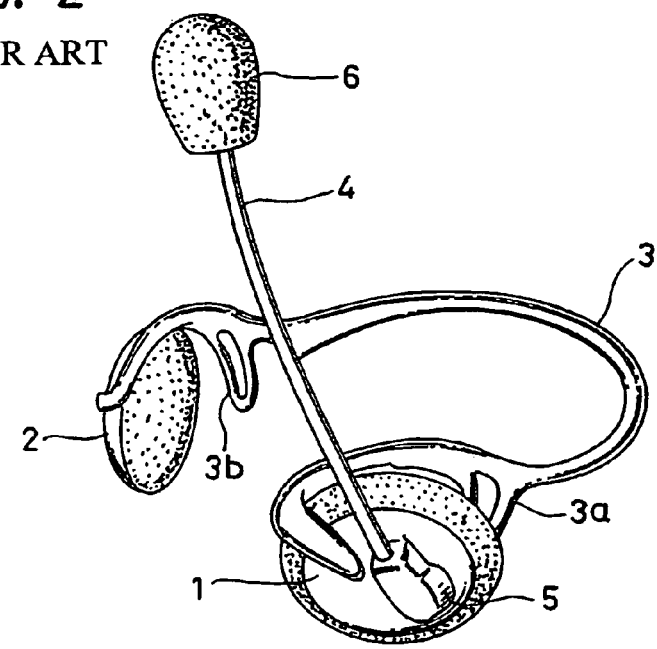
FIG. 2 is a perspective view showing an example of the headset of FIG. 1, in which a microphone is not being used.
Figure 3:
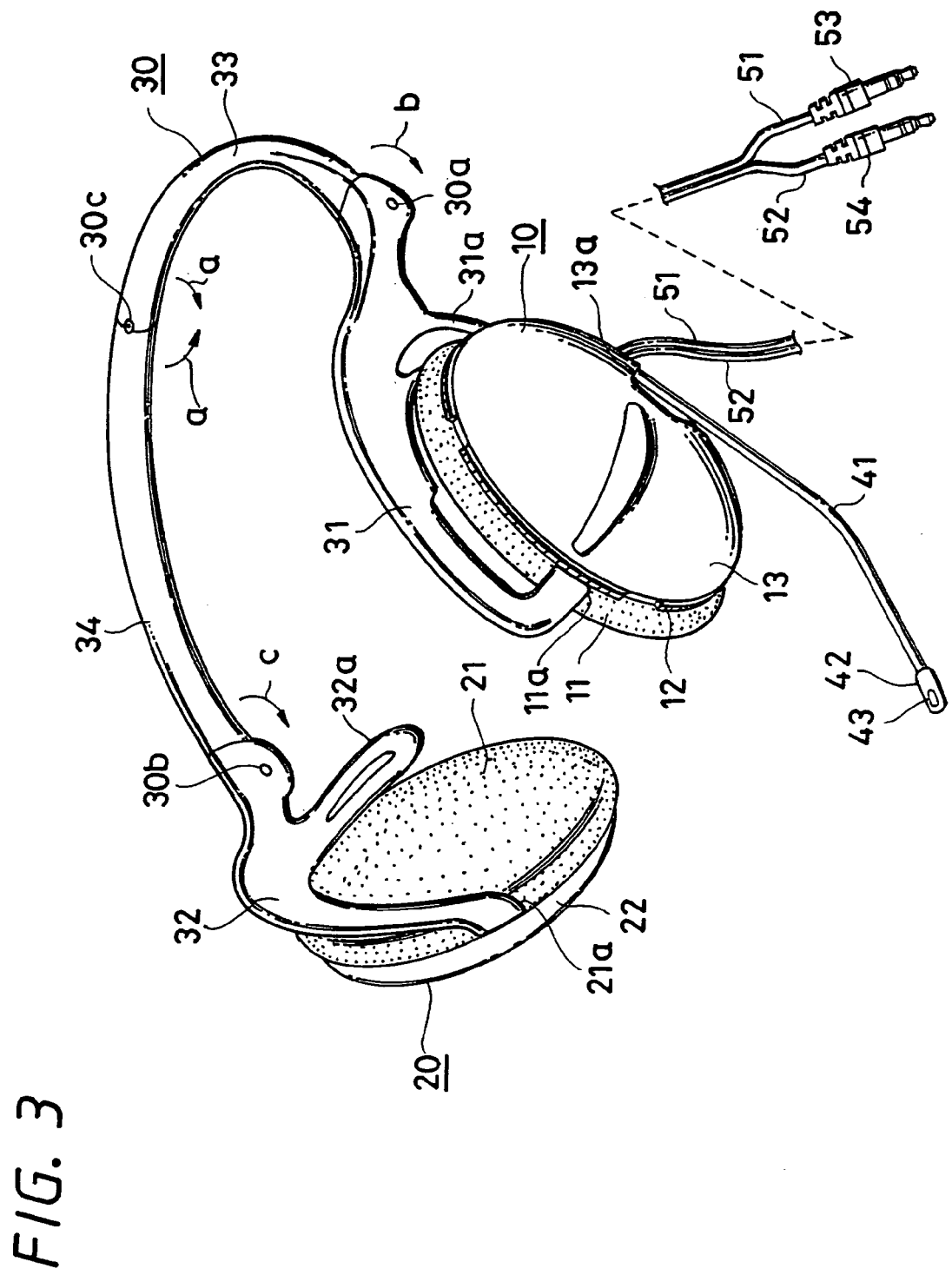
FIG. 3 is a perspective view showing an embodiment of a headset of the present invention, in which an arm is pulled out.
Figure 4:
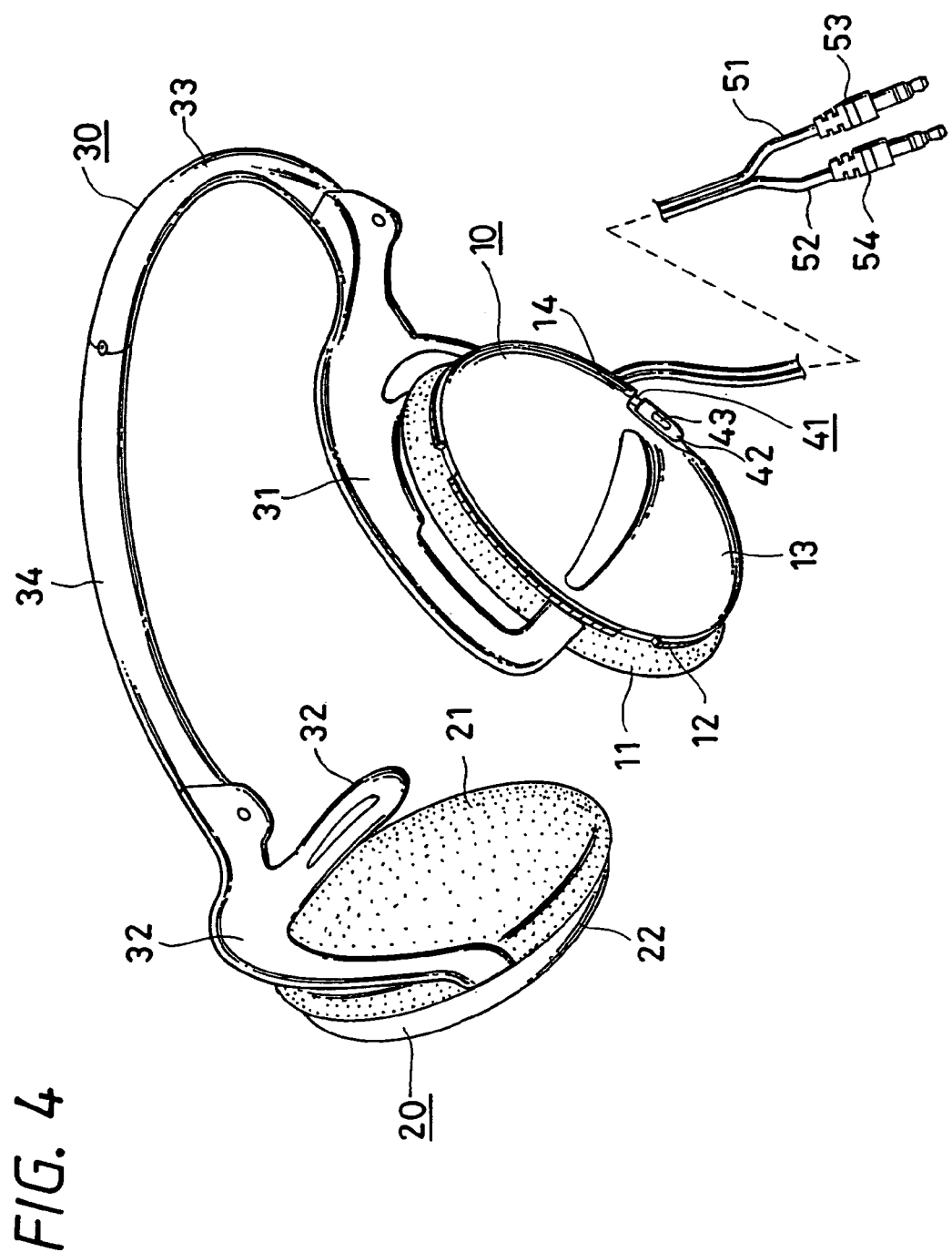
FIG. 4 is a perspective view showing an embodiment of a headset of the present invention, in which an arm is stored.

FIGS. 3 and 4 are perspective views showing a headset according to the embodiment: FIG. 3 shows the state in which an arm is pulled out and FIG. 4 shows the state in which the arm is stored. The headset according to this embodiment functions as a pair of headphones in which a left housing 10 and a right housing 20 are connected by a band 30, and an arm 41 connected to a microphone is attached to the left housing 10 side. A driver unit (speaker unit) which outputs sound provided with a sound signal (audio signal) is disposed in each of the housings 10 and 20. The construction of the inside of the housing will later be described.

Hereupon, the band 30 is constructed as a so-called neck-band type band which passes behind a wearer's head. Specifically, the band 30 is approximately semicircular in shape, the left housing 10 is attached to one end of the semicircular band 30, the right housing 20 is attached to the other end, and the band 30 passes behind the wearer's head approximately horizontally when the headset is being worn.

The band 30 of the embodiment is divided into four parts: a first member 31, a second member 32, a third member 33, and a fourth member 34, and those members 31 to 34 are integrally connected such that each of the members can freely turn at connecting portions 30a, 30b, and 30c which are constructed as hinges, the left housing 10 is attached to an end of the first member 31, and the right housing 20 is attached to an end of the second member 32.

The first member 31 to which the left housing 10 is attached is positioned on an upper part of the left auricle when worn and functions as a hook held by the auricle. Similarly, the second member 32 to which the right housing 20 is attached is positioned on an upper part of the right auricle when worn and functions as a hook held by the auricle. A left auricle holding portion 31a extending downward is provided in the middle of the first member 31. In addition, a right auricle holding portion 32a extending downward is also provided in the middle of the fourth member 34. With these auricle holding portions 31a and 32b positioned behind the left and right auricles when worn, the position at which each of the housings 10 and 20 is worn is fixed on the front side of each of the left and right auricles.

Ear pads 11 and 21 formed of sponge or other materials are attached to the side, which is in contact with the auricle side, of the housings 10 and 20 respectively, when the housings 10 and 20 are worn, and the driver units are each disposed inside the ear pads 11 and 21 so that sounds (audio) output through the ear pads 11 and 21 reach the auricle side.

The band 30 of the embodiment has a four-part construction as mentioned above, and the headset can be folded up to become small by turning each of the four parts at the connecting portions 30a, 30b, and 30c which are constructed as hinges. Specifically, when the headset is folded up, the third and fourth members 33 and 34 are folded inward such that the both members face each other at the connecting portion 30c located at the rear center as indicated by an arrow a in FIG. 3. Also, the first and second members 31 and 32 are folded downward at the left and right connecting portions 30a and 30b as indicated by the arrows b and c in FIG. 3. Accordingly, the headset can be folded to be extremely small when it is stored.

It should be noted that a signal line which connects the left and right housings 10 and 20 is passed inside the band 30 of the embodiment, and signal lines 51 and 52 led from the headset to the outside are pulled out only from the left housing 10 side. The two signal lines 51 and 52 pulled out of the left housing 10 to the outside are integrally pulled out to the outside; a plug 53 for a sound signal is attached to the end of the signal line 51, and a plug 54 for a microphone is attached to the end of the signal line 52.

Figure 12:
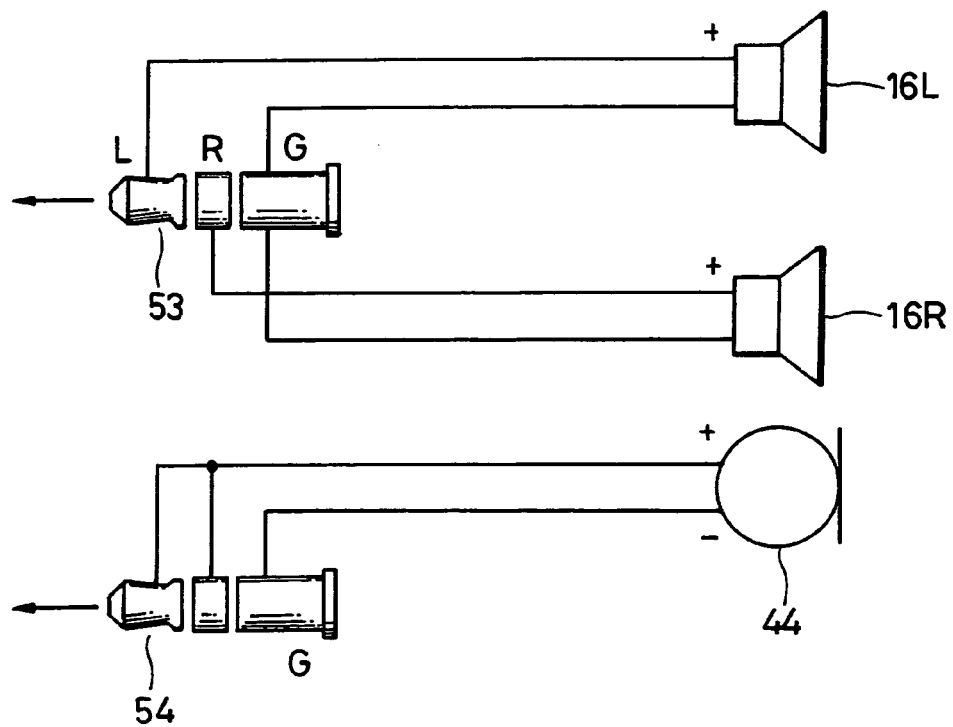
FIG. 12 is an explanatory view showing an example of connection of a headset according to an embodiment of the present invention.

As shown in FIG. 12, in an example of wiring using the signal lines 51 and 52, for example, a left electrode (L) and a ground electrode (G) of the plug 53 for a sound signal are connected to a driver unit 16L in the left housing 10, and the right electrode (R) and the ground electrode (G) of the plug 53 for a sound signal are connected to a driver unit 16R in the right housing 20 by means of the signal line 51, respectively. Also, each electrode of the plug 54 for a microphone is connected to a microphone 44 in the left housing 10 by means of the signal line 52.

When the headset of the embodiment is connected to electronic equipment such as a communication device, the plug 53 for a sound signal is inserted into a jack which forms an audio output terminal of the device, and the plug 54 for a microphone is inserted into a jack which forms an audio input terminal of the device, for example. When the headset is used as headphones, only the plug 53 for a sound signal is inserted into a jack constituting an output terminal for headphones, and the plug 54 for a microphone is not used. Note that the signal line 51 which connects the plug 53 for a sound signal to the driver units 16L and 16R may be directly pulled out from each of the left and right housings 10 and 20 instead of being passed inside the band 30 which connects the left and right housings 10 and 20.

Figure 5:
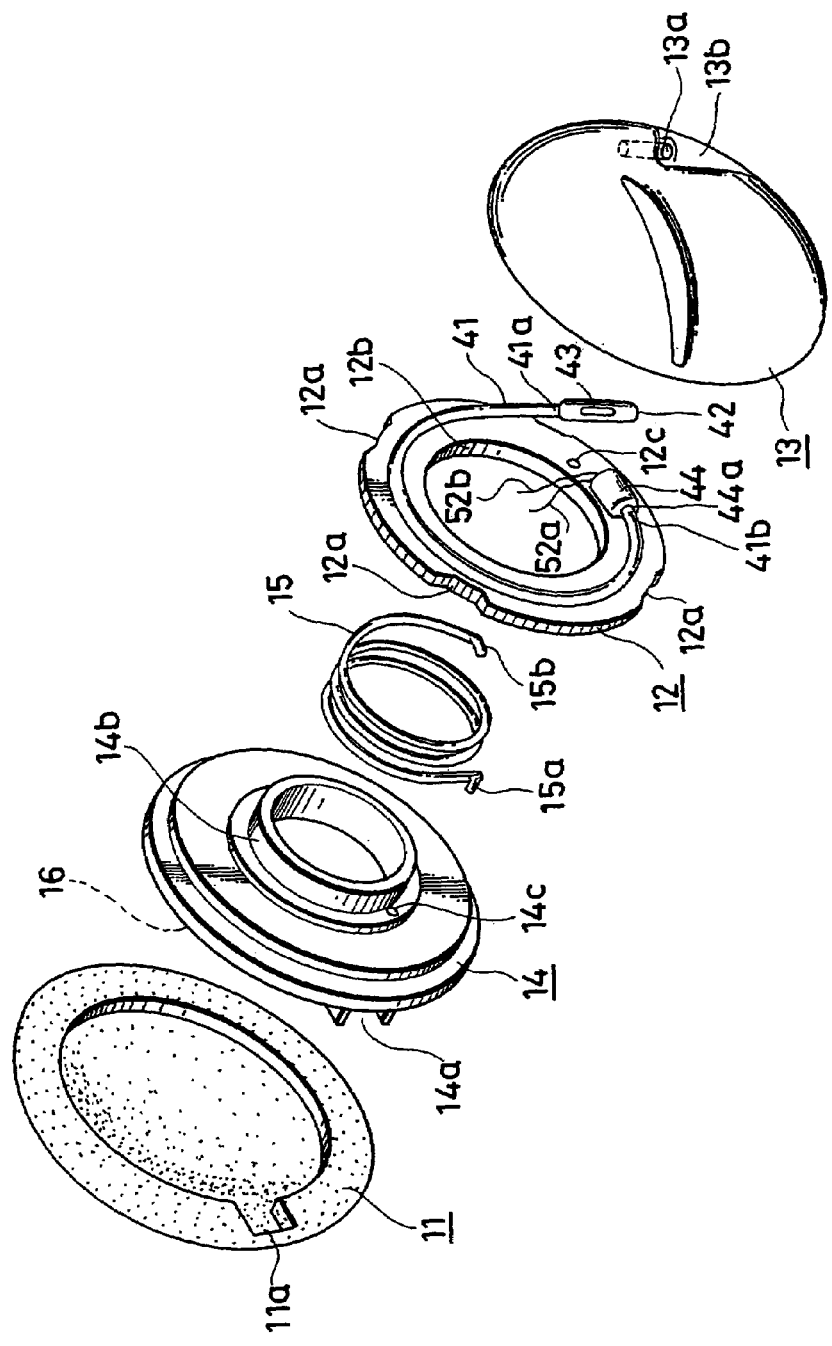
FIG. 5 is a perspective view showing in an exploded manner a housing of a headset according to an embodiment of the present invention.
Figure 6:
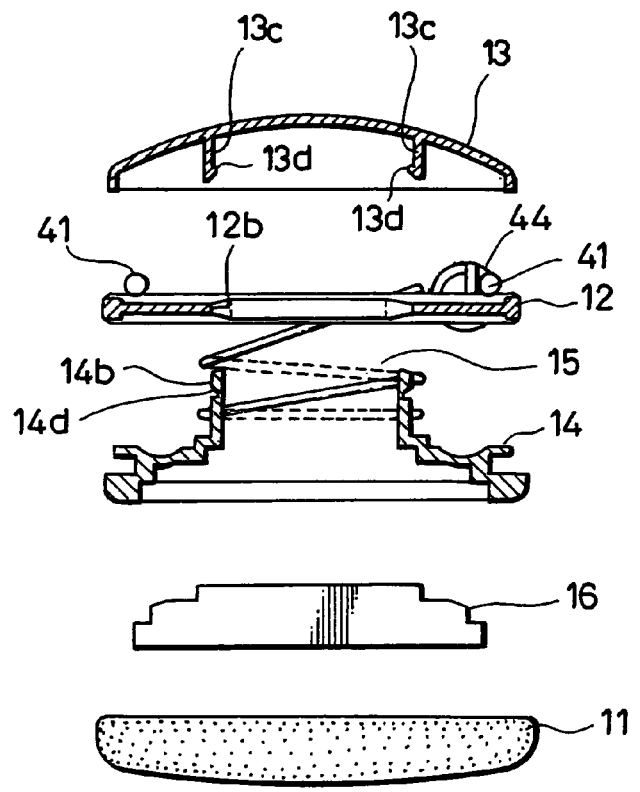
FIG. 6 is a cross-sectional view showing an exploded state of a housing of a headset according to an embodiment of the present invention.
Figure 7:
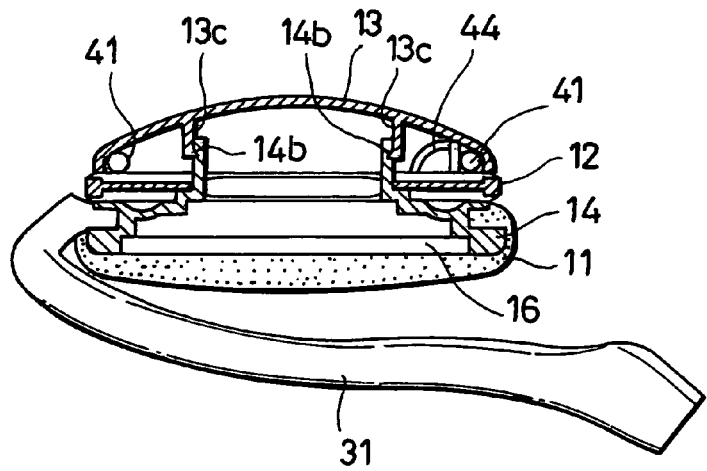
FIG. 7 is a cross-sectional view showing an assembled state of a housing of a headset according to an embodiment of the present invention.

Next, structures concerning the arm and the microphone attached to the left housing 10 of the headset of the embodiment are explained. FIGS. 5 and 6 are views in an exploded manner showing the left housing 10 to which the arm 41 is attached: FIG. 5 is an exploded perspective view and FIG. 6 is a cross-sectional view. Further, FIG. 7 shows the same cross-section as in FIG. 6 of an assembled state.

With respect to the left housing 10 of the embodiment, a circular driver retaining member 14 is prepared inside; a driver unit 16 is attached to the inside of the driver retaining member 14, that is a reverse side in FIG. 5; and the ear pad 11 is attached to cover the driver unit 16. A band connecting structure 14a is formed on the side surface of the driver retaining member 14 and, in addition, a cutaway portion 11a is also formed on the ear pad 11 side to avoid the connected band 30. Further, an annular stepped portion 14b is provided on the outside of the driver retaining member 14 and in the vicinity thereof a spring stop hole 14c is formed. When the housing is assembled, one end 15a of a later-mentioned spring 15 is inserted in the spring stop hole 14c to be locked.

On the outside of the driver retaining member 14 constructed as described above, a microphone holding ring 12 is placed, and further on the outside thereof a cap 13 is placed. On the later described assembly of the housing, the microphone holding ring 12 is disposed in such a state in which the ring can turn with respect to the other members (the driver retaining member 14, the cap 13 and so forth).

The microphone holding ring 12 is circular in shape and has an outer shape slightly larger than the cap 13, and the peripheral part thereof is exposed to the outside of the housing on the later described assembly. A plurality of concave portions 12a are provided at predetermined intervals on this peripheral part exposed to the outside, and on the surface of the peripheral part grooves are formed in order for the user to hold the ring 12 easily on the operation. A circular hole 12b is formed at the center of the microphone holding ring 12, and this circular hole 12b fits into the annular stepped portion 14b of the driver retaining member 14. Note that since a coiled spring 15 is placed between the annular stepped portion 14b and the circular hole 12b on the assembly, the circular hole 12b is formed of the size with room for the coiled spring 15. Further, a spring stop hole 12c for locking the other end 15b of the coiled spring 15 is formed in the microphone holding ring 12.

As shown in FIG. 5, the small microphone 44 is fixed at a predetermined position close to the periphery of the microphone holding ring 12. Signal lines 52a and 52b connected to this microphone 44 are pulled out to the outside of the housing 10 as the signal line 52 shown in FIGS. 3 and 4. In this case, the signal lines 52a and 52b are disposed sufficiently loose inside the housing 10. This looseness is provided for preventing the signal lines 52a and 52b from breaking when the position of the microphone 44 is changed because of the turning of the microphone holding ring 12.

The arm 41 is connected to the microphone 44 fixed to the microphone holding ring 12. The arm 41 is constructed of a hollow member having flexibility and capable of being bent; a cylindrical resin member 42 is fixed to an end 41a; and a base end 41b is fixed to the ring 12 side in the state of being connected to an audio input portion 44a of the microphone 44.

A hole 43 is provided in the resin member 42 attached to the end of the arm 41 and from this hole 43 at the end to the base end 41b of the arm 41, the arm has a hollow construction in which the inside is continuous. Therefore, sound which has been input from the hole 43 at the end of the arm 41 reaches the audio input portion 44a of the microphone 44 fixed to the microphone holding ring 12, and the microphone 44 picks up sounds in the vicinity of the position at which the end of the arm 41 is placed.

In this embodiment, the arm 41 is slightly shorter than the circumference of the microphone holding ring 12. The arm 41 and the cap 13 are shown separately in FIG. 5 for the explanation; however, the arm 41 is practically passed through a through-hole 13a provided in the peripheral part of the cap 13, and the resin member 42 is attached to the end 41a of the arm 41 pulled out of the through-hole 13a to the outside of the housing. As shown by the broken line in FIG. 5, the through-hole 13a provided in the cap 13 has a certain length (for example several mm) linearly. An arm passing dent 13b is provided in the peripheral part, which is outside the through-hole 13a, of the cap 13. This arm passing dent 13b has such a shape as can store the resin member 42 at the end of the arm 41, for example.

Figure 9:
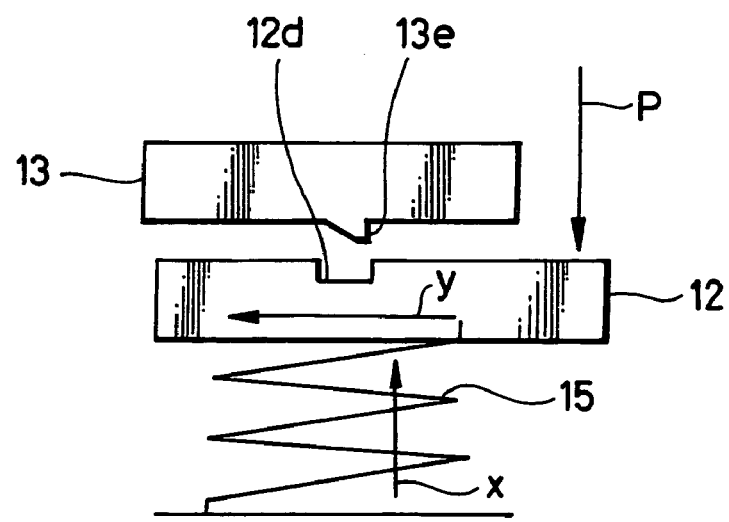
FIG. 9 is an explanatory view showing the principle of an anti-turning mechanism according to an embodiment of the present invention.

As shown in FIG. 6, an annular wall portion 13c is formed inside the cap 13. This annular wall portion 13c is fitted to the outside of the annular stepped portion 14b of the driver retaining member 14 when the housing is assembled. On this occasion, in order to maintain the connection between the cap 13 and the driver retaining member 14, a convex portion 13d is formed on the annular wall portion 13c side and a concave portion 14d is formed on the driver retaining member 14 side respectively, and the convex portion 13d on the cap 13 side is engaged with the concave portion 14d on the driver retaining member 14 side, when the housing is assembled. Note that, although not shown in figures such as FIG. 5, an anti-turning convex portion (later-mentioned convex portion 13e: FIG. 9) is provided inside the cap 13 and an anti-turning concave portion (later-mentioned concave portion 12d: FIG. 9) is provided on the microphone holding ring 12 side, so that when the ring 12 is in a predetermined turning position, the convex portion on the cap 13 side and the concave portion on the ring 12 side are contacted.

Next, the assembled state of the left housing 10 constructed as described above is explained, referring to FIG. 7. Note that the disposed state of the spring 15 is omitted in FIG. 7. In the assembled state of the housing 10, the spring 15 is located between the annular stepped portion 14b of the driver retaining member 14 and the circular hole 12b of the microphone holding ring 12, in which one end 15a thereof is caught in the spring stop hole 14c of the driver retaining member 14 shown in FIG. 5 and thus locked and other end 15b thereof is caught in the spring stop hole 12c of the microphone holding ring 12 shown in FIG. 5 and thus locked.

With the coiled spring 15 disposed in this manner, the circular hole 12b of the microphone holding ring 12 is fitted to the annular stepped portion 14b of the driver retaining member 14 and also the annular wall portion 13c of the cap 13 is fitted to the annular stepped portion 14b of the driver retaining member 14. On this occasion, as described above, the convex portion 13d on the cap 13 side is engaged with the concave portion 14d on the driver retaining member 14 side, so that the driver retaining member 14 and the cap 13 are combined to be a unit. It is possible to turn the microphone holding ring 12 provided therebetween during the assembling. However, since the spring 15 is provided, the resilient force of the spring 15 acts when the ring 12 is turned.

In the housing 10, the arm 41 connected to the microphone 44 fixed to the microphone holding ring 12 is placed close to the peripheral part in the space between the microphone holding ring 12 and the cap 13. In the housing 10, in other words, the arm 41 is positioned outside the annular wall portion 13c inside the cap 13 shown in FIGS. 6 and 7. It should be noted that some kind of arm retention mechanism such as a groove may be provided in order to fix the position of the arm 41 inside the housing 10.

Then, as shown in FIG. 7, in the assembled state of the housing, the peripheral part of the microphone holding ring 12 is exposed to the outside, and with holding and turning this peripheral part of the ring 12 by the user, the turning position of the microphone 44 fixed to the microphone holding ring 12 is changed, so that the length of the part of the arm 41 connected to this microphone 44, protruding from the through hole 13a of the cap 13 for pulling out the arm is changed.

The hole 13a for pulling out the arm is formed linearly for a certain length, so that the part of the arm 41 pulled out of the hole 13a is made approximately linear. Specifically, as heretofore described, the arm 41 is constructed of a hollow member having flexibility and capable of being bent; and when stored in the housing 10, the arm 41 is stored along the peripheral part of the microphone holding ring 12, becoming circular in shape; however, when pulled out of the linear hole 13a, the arm 41, which has been bent into a circular shape, is made linear and pulled out of the housing 10 to the outside.

Figure 8:
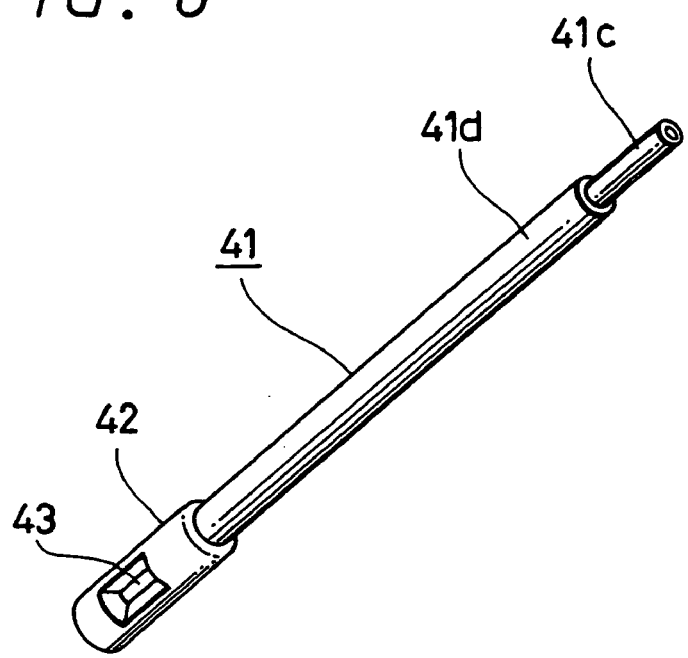
FIG. 8 is a perspective view showing an example of an arm structure according to an embodiment of the present invention.

As regards the construction of the arm 41, as shown, for example, in FIG. 8, the thickness thereof is made thin and the surface of a metal pipe 41c made of freely bendable material such as brass is covered with a resilient resin tube 41d to form the arm 41. The resin member 42 is attached to an end of the arm 41, and the hole 43 provided in this resin member 42 is led to the inside of the pipe 41c. A plurality of holes 43 (for example both on the front and rear sides) may be provided in the resin member 42 at the end thereof.

According to the construction of the arm 41 of the metal pipe 41c made of brass or the like in this manner, the arm 41 pulled out of the linear hole 13a of the cap 13 is made to be favorably linear.

When the microphone holding ring 12 has been turned and the arm 41 is in the maximum turned position of fully being pulled out of the hole 13a of the cap 13, an anti-turning convex portion 13e on the cap 13 side is engaged with an anti-turning concave portion 12d of the microphone holding ring 12 as shown in FIG. 9, so that even if the resilient force of the spring 15 acts on the ring 12, the microphone holding ring 12 is stopped from turning and the arm 41 remains as pulled out. Specifically, as shown in FIG. 9, on the coiled spring 15 locked to the microphone holding ring 12, a force x which pushes the ring 12 toward the cap 13 side and a force y which rotates the ring 12 act; however, since the convex portion 13e on the cap 13 side is engaged with the concave portion 12d on the ring 12 side, the turned position of the ring 12 is fixed against the turning force y, so that the arm 41 attached to the ring 12 is maintained in the state of extending from the hole 13a of the cap 13.

When, in that state, a force which pushes the peripheral part of the ring 12 in the direction from the outside (a force P in the direction shown in FIG. 9) is exerted from outside by the user's operation, the convex portion 13e on the cap 13 side is disengaged from the concave portion 12d on the ring 12 side, the ring 12 is turned by the resilient force of the spring 15, and then the arm 41 is pulled into the housing from the hole 13a to be wound and stored inside the housing 10. While the arm 41 is in the state of being wound and stored inside the housing 10, only the resin member 42 at the end of the arm 41 protrudes from the hole 13a of the cap 13 to the outside as shown, for example, in FIG. 4.

Figure 10:
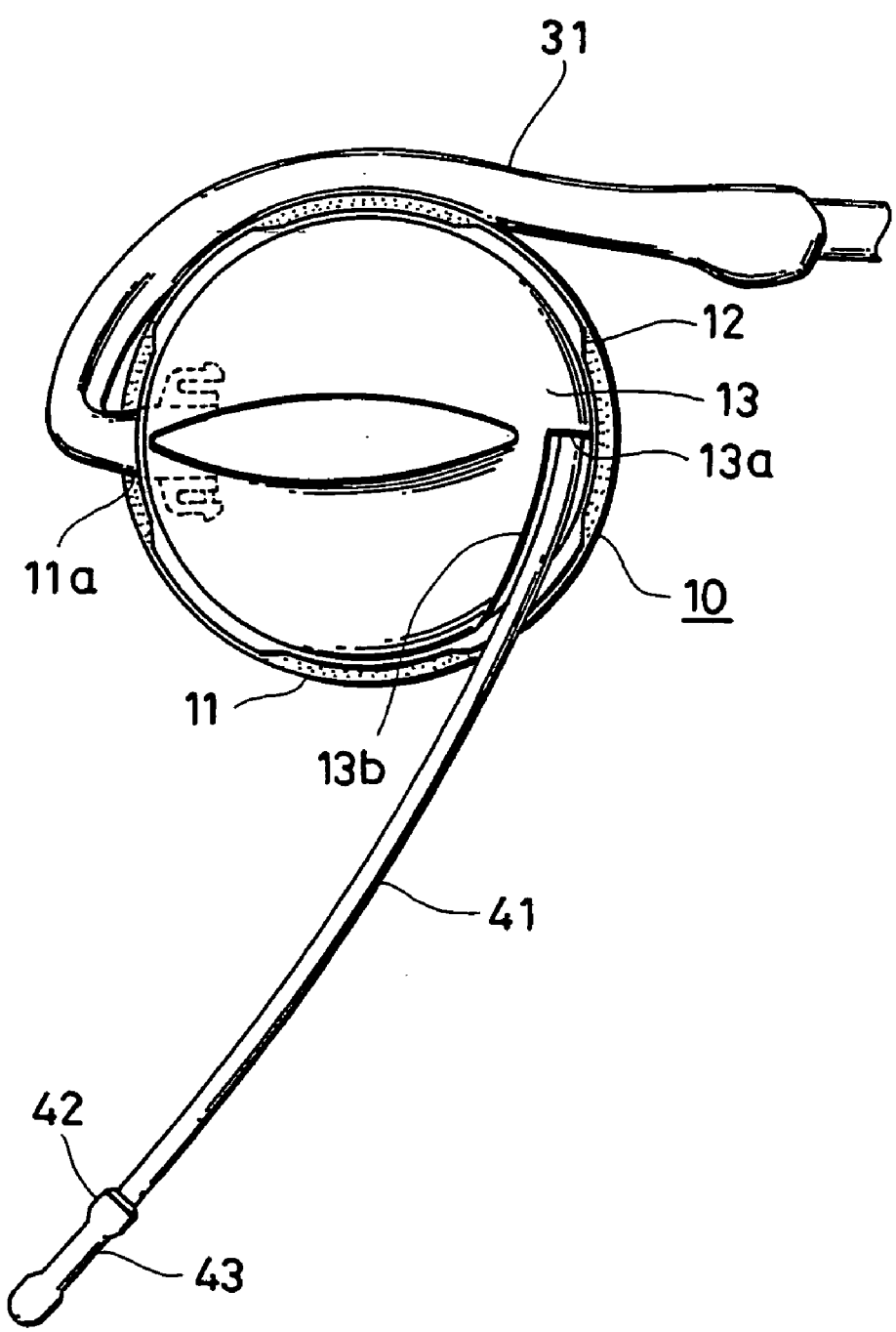
FIG. 10 is a side view of a headset according to an embodiment of the present invention.

FIG. 10 is a view showing the left housing 10 with the arm 41 extended. In the state of being pulled out like this, the arm 41 extends approximately linearly, and the resin member 42 at the end of the arm 41 is positioned close to the wearer's mouth. Specifically, as shown in FIG. 11, by extending the arm 41 with the housings 10 and 20 worn on the user's left and right auricles $e_1$ and $e_2$, the resin member 42 at the end of the arm 41 is positioned close to the wearer's mouth m, the microphone 44 in the housing 10 picks up sound input from the hole 43 provided in the resin member 42, and accordingly picks up the wearer's voice favorably.

Figure 11:
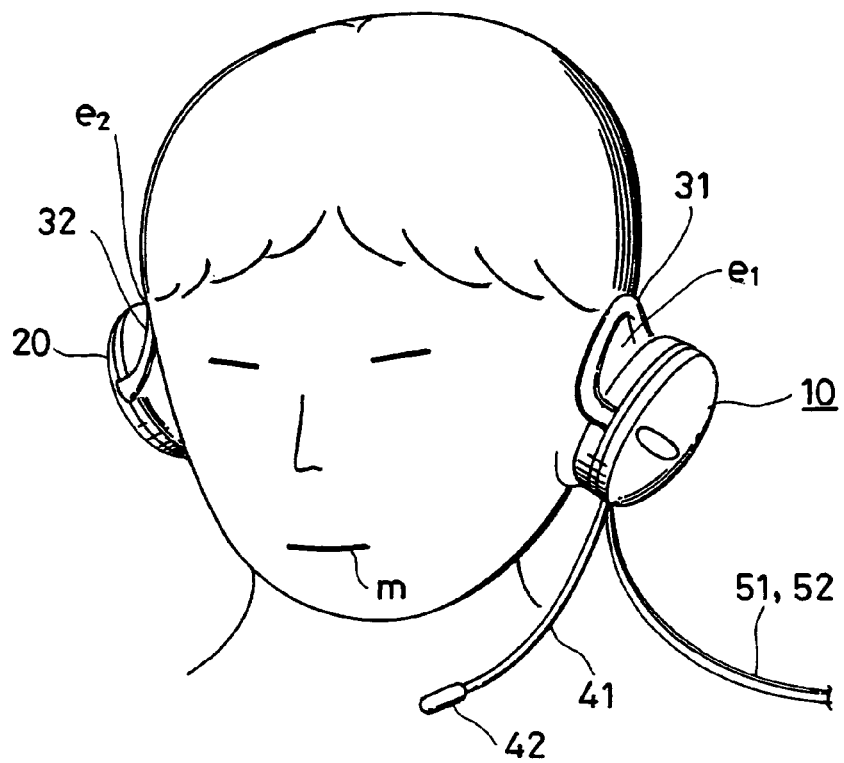
FIG. 11 is a perspective view showing an embodiment of the present invention, in which a headset is worn.

Since a pipe made of metal such as brass is used as the arm 41 in this embodiment, when the arm 41 has been extended as shown, for example, in FIG. 11, the wearer easily holds the arm 41 directly by hand and can adjust the position of the resin member 42 at the end. Specifically, the arm 41 extends only approximately linearly if it is simply pulled out; only the end to which the resin member 42 is attached may be slightly curved so that it faces the direction of the wearer's mouth m as shown in FIG. 11.

According to the headset of this embodiment, as described above, the length of the arm 41 attached to the left housing 10 is capable of being extended and shortened freely, and by pulling the arm out of the housing 10, the microphone 44 attached to the housing 10 starts picking up the wearer's voice, thereby favorably functioning as a headset. If the microphone need not be used and the wearer wants to use the headset simply as headphones, with the arm 41 being wound and stored inside the housing 10 the headset will be almost shaped like a pair of conventional headphones with only the resin member 42 at the end of the arm 41 slightly protruding from the housing 10, as shown in FIG. 4, and can favorably be used as headphones.

Further, when the headset is stored with the band 30 folded up, the arm 41 can not be an obstacle while it is stored, because the arm 41 is wound and stored in this manner, so that the headset can be conveniently carried.

Further, in this embodiment, the spring 15 is locked to the microphone holding ring 12 to which the arm 41 is connected and the ring 12 is turned by this spring 15, the force of which pulls the arm 41 into the housing 10, so that when the arm 41 is stored, with only releasing the engagement between the convex portion 13e on the cap 13 side and the concave portion 12d on the ring 12 side, the arm 41 is automatically pulled into the housing 10 to be stored easily.

Figure 13:
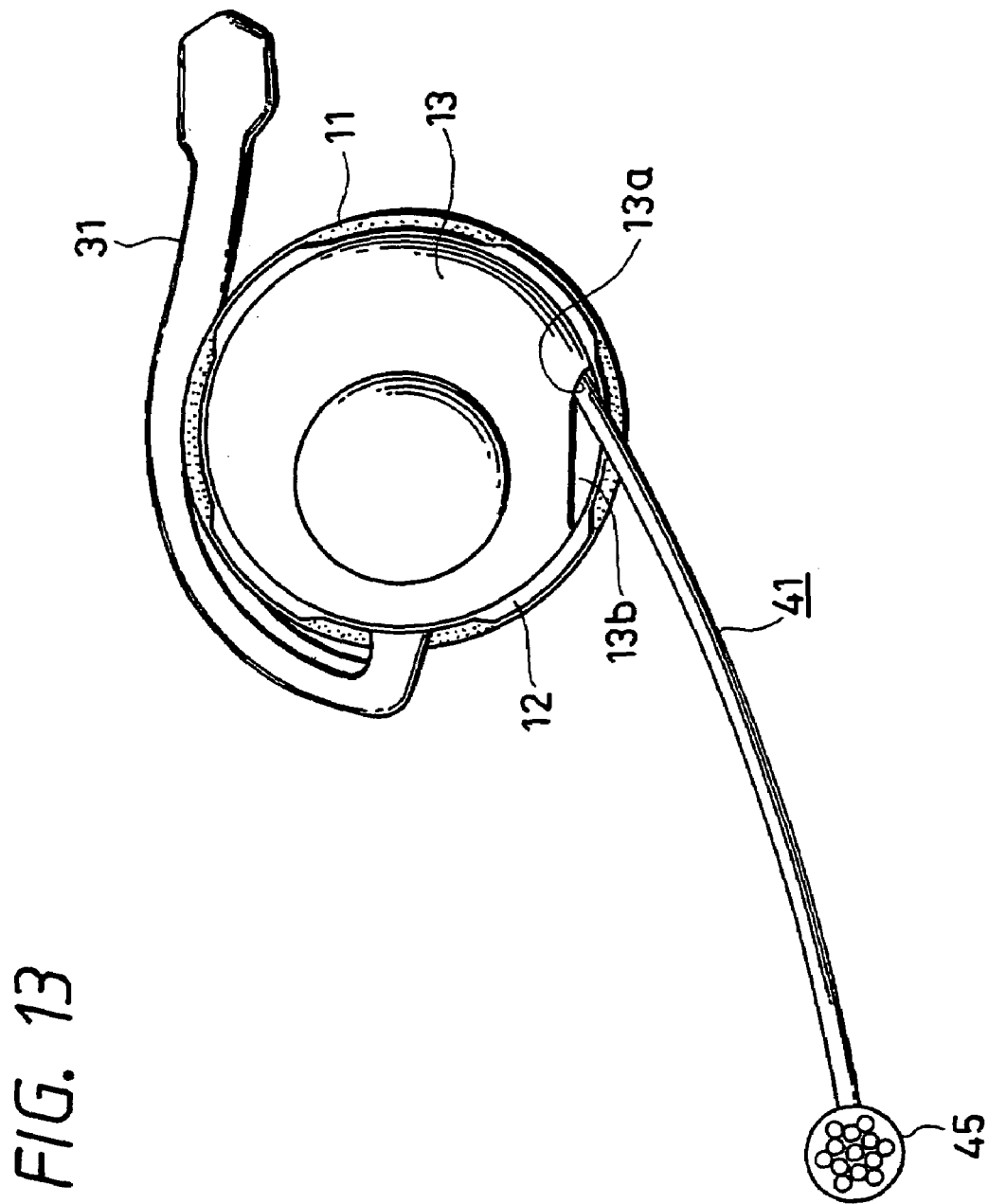
FIG. 13 is a side view showing an example (in which a microphone is attached to an end of an arm) of a headset according to another embodiment of the present invention.

It should be noted that although the microphone 44 is placed inside the housing 10 and only the hollow arm 41 is extended in the embodiment explained above, a microphone may be directly attached to the end of the arm. Specifically, as shown, for example, in FIG. 13, a microphone 45 may be attached to the end of the arm 41 pulled out of the hole 13a of the cap 13 constituting the left housing, so that the microphone 45 can pick up the wearer's voice and the like directly. In this case, a signal line which is connected to the microphone 45 needs to be passed through inside the arm 41.

Further, although the microphone is directly connected to the plug 54 via the signal line in the above-mentioned embodiment, a switch for muting the output from the microphone may be provided in the middle of the signal line. Then, there may be considered such a case as the switch automatically mutes the output when the arm 41 is stored, in addition to a case in which a switch is directly operated by the user.

Figure 14:
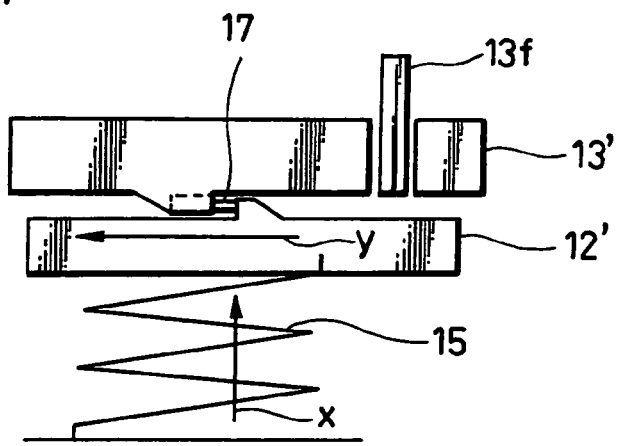
FIG. 14 is an explanatory view showing an anti-turning mechanism of a headset (example in which a mute switch is linked with the storage of an arm) according to another embodiment of the present invention.

FIG. 14 is a view showing an example of a case in which a mute switch 17 linked with the storage of the arm is provided. For example, when the mute switch 17 is provided inside a cap 13' and a ring 12' is positioned with the arm 41 being stored by the force of the spring 15, the mute switch 17 is pushed by the ring 12' so that the output from the microphone is muted. According to this construction, the microphone can automatically pick up a voice and the like when the arm 41 is pulled out, and the microphone is automatically put into the muted state so as not to pick up noise or the like when the arm 41 is stored inside the housing 10.

Figure 15:
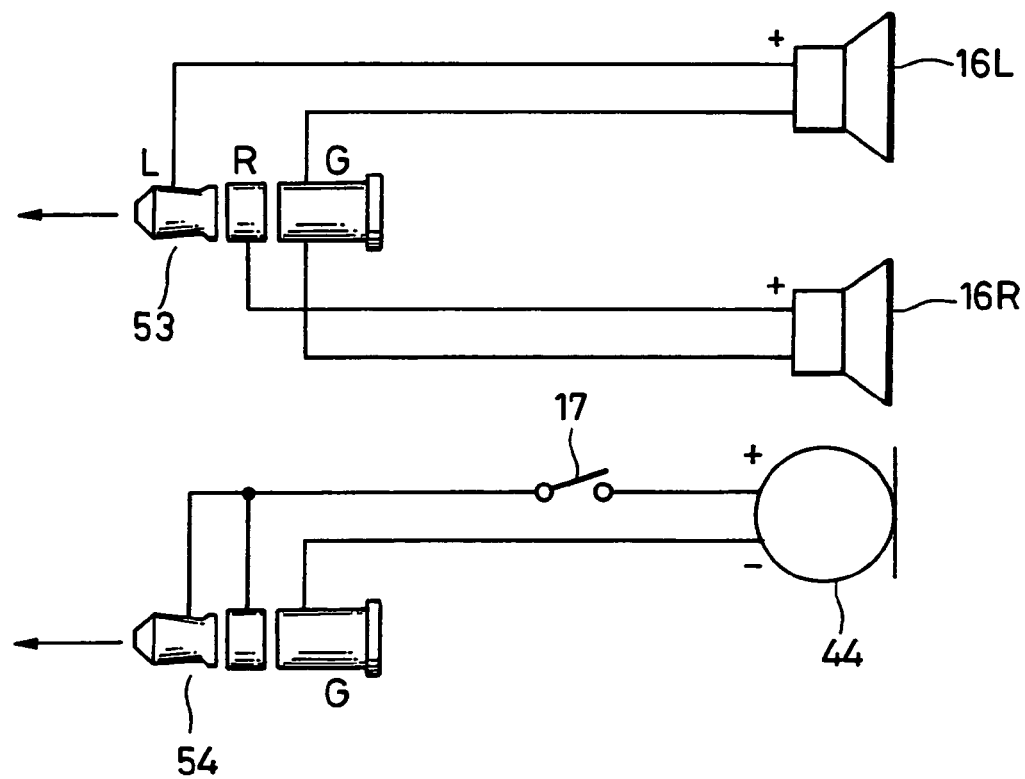
FIG. 15 is an explanatory view showing an example of connection with respect to the example shown in FIG. 14.

FIG. 15 is a view showing an example of connection of this mute switch 17. As shown in FIG. 15, the mute switch 17 may be provided in the middle of the signal line between the microphone 44 and the plug 54. It is not necessary to provide a switch on the signal line on the driver units 16L and 16R side.

Furthermore, although the arm is wound and stored inside the housing in the above embodiment, the arm may be linearly stored inside the housing. Specifically, as shown, for example, in FIG. 16, a microphone is installed inside a housing 80 and an end of an arm 83 is connected to the microphone. A tip 84 of the arm 83 can be extended linearly outward from a hole 81a of a cap 81. On this occasion, the tip 84 of the arm 83 is extended diagonally downward approximately at an angle of 45° from the housing 80 worn on the user's auricle and is positioned close to the wearer's mouth. When stored inside the housing 80, the arm 83 remains linear as shown by the broken line. The housing 80 is worn on the user's auricle with a hook 82, and a signal line 85 is pulled out of the housing 80 to the outside.

Figure 16:
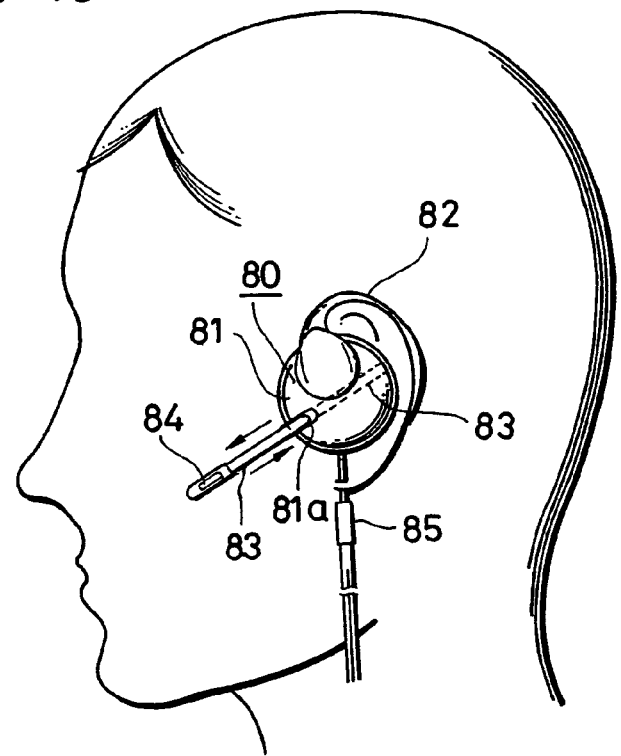
FIG. 16 is a side view showing the state in which a headset according to another embodiment (example in which an arm extends and contracts linearly) of the present invention is worn.

With a construction shown in this FIG. 16, there can be also obtained a headset in which the arm is capable of being extended and shortened freely. In the case of the construction shown in this FIG. 16, since the length of the arm cannot be made long enough, it is difficult to bring the tip 84 of the arm close to the wearer's mouth; however, given the microphone's performance, an arm of such length may not cause a problem when picking up the wearer's voice.

It should be noted that although only the left housing is shown in the example shown in FIG. 16, such construction as only one housing provided on one side is also acceptable as a headset. As regards the embodiment shown in FIGS. 3 to 13, a construction, in which only a left housing having an arm and a hook with which the left housing is worn on the auricle without a band are provided, can also be acceptable. Further, although in the above embodiments the explanation was given to the arm and microphone which are to be attached to the left housing, the reverse construction may also be possible, in which the arm and the microphone are provided in the right housing and not providing these members in the left housing.

Figure 17:
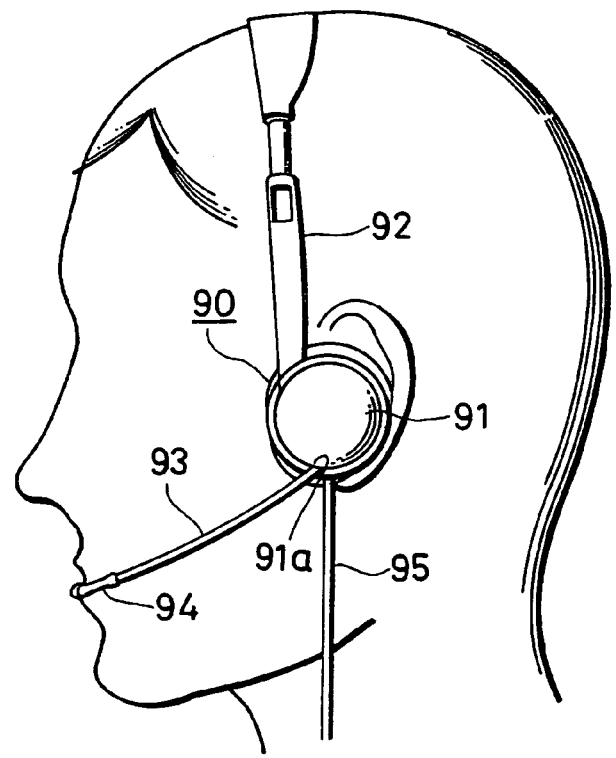
FIG. 17 is a side view showing the state in which a headset according to another embodiment (example of a construction in which a band is passed over the head) of the present invention is worn.

Further, although a so-called neck-band type band which passes behind the wearer's head is constructed as the band which connects the left and right housings, the left and right housings may be connected using a band which passes above the wearer's head. Specifically, as shown, for example, in FIG. 17, when a left housing 90 is constructed such that an arm 93 is pulled out of a hole 91a of a cap 91 for pulling out the arm and a resin member 94 at the end of the arm 93 is positioned in the vicinity of the wearer's mouth, the left housing 90 and a right housing not shown in the figure are connected by a band 92 which passes above the wearer's head. A signal line 95 is pulled out of the left housing 90. The headset having such construction functions in the same manner as the headset in the above-mentioned embodiment.

Further, another form of housing, band, or the like may be applied.

INDUSTRIAL APPLICABILITY

According to the headset of the present invention, an arm to which a microphone is attached is pulled out of a housing and the end of the arm comes close to the wearer's mouth, so that sounds emitted by the wearer can be picked up with the microphone, and the headset favorably functions. Further, since the arm is stored in the housing so as not to protrude from the housing when the microphone need not be used, the shape of the headset becomes substantially the same as those of a pair of conventional headphones without a microphone, so that usability and portability when the arm is stored are improved.

DESCRIPTION OF REFERENCE NUMERALS

1......LEFT HOUSING
2......RIGHT HOUSING
3......BAND
4......ARM
5......SUPPORTING MEMBER
6......MICROPHONE
10......LEFT HOUSING
11......EAR PAD
11a......CUTAWAY PORTION
12, 12'......MICROPHONE HOLDING RING
12a......CONCAVE PORTION
12b......CIRCULAR HOLE
12c......SPRING STOP HOLE
12d......ANTI-TURNING CONCAVE PORTION
13, 13'......CAP
13a......ARM PULL-OUT HOLE
13b......ARM PASSING DENT
13c......ANNULAR WALL PORTION
13d......CONVEX PORTION
13e......ANTI-TURNING CONVEX PORTION
13f......EXTRUSION PIN
14......DRIVER RETAINING PORTION
14a......BAND CONNECTING STRUCTURE
14b......ANNULAR STEPPED PORTION
14c......SPRING STOP HOLE
14d......CONCAVE PORTION
15......SPRING
15a......ONE END OF SPRING
15b......OTHER END OF SPRING
16L, 16R......DRIVER UNIT
17......MUTE SWITCH
20......RIGHT HOUSING
21......EAR PAD
21a......CUTAWAY PORTION
22......CAP
30......BAND
30a, 30b, 30c......BAND CONNECTING PORTION
31, 32, 33, 34......MEMBER CONSTITUTING BAND
31a......LEFT AURICLE HOLDING PORTION
32a......RIGHT AURICLE HOLDING PORTION
41......ARM
41a......END OF ARM
41b......BASE END OF ARM
41c......METAL PIPE
41d......RESIN TUBE
42......RESIN TUBE FOR THE END OF ARM
43......HOLE
44, 45......MICROPHONE
51, 52, 52a, 52b......SIGNAL LINE
53......PLUG FOR AUDIO SIGNAL
54......PLUG FOR MICROPHONE
80......HOUSING
81......CAP
81a......ARM PULL-OUT HOLE
82......HOOK
83......ARM
84......CAP FOR TIP OF ARM
85......SIGNAL LINE
90......LEFT HOUSING
91......CAP
91a......ARM PULL-OUT HOLE
92......BAND
93......ARM
94......CAP FOR TIP OF ARM
95......SIGNAL LINE

The invention claimed is:

1. A headset, comprising:
a housing worn on one of wearer's auricles;
a driver unit which is accommodated in said housing and outputs a sound corresponding to a provided sound signal;
an arm having a predetermined length and two ends comprising a first end and a second end, the first end of the arm being accommodated in the housing and the second end being pulled out of a hole of the housing to the outside, an arm portion being exposed upon the second end being pulled out of the hole of the housing, a length of the arm portion being adjusted by pulling the second end out of the hole of the housing; and a microphone attached to said arm;

wherein an arm-attaching member, to which the first end of said arm is attached inside said housing, capable of turning with respect to said housing is provided;

said arm is wound along the approximately outermost peripheral part in said housing by the turning of the arm-attaching member; and said arm-attaching member is connected to said housing side through a take-up spring, and said arm is wound into the housing by the turning of said arm-attaching member with the resilient force of said take-up spring.

2. A headset according to claim 1, wherein said arm is constructed of a resilient hollow pipe and wound along the approximately outermost peripheral part in said housing and accommodated.

3. A headset according to claim 2, wherein a guide portion, which guides the arm linearly or in the direction opposite to the direction in which said arm is wound, is provided in the vicinity of the hole of said housing.

4. A headset according to claim 2, wherein said microphone is attached to the first end of said arm attached inside said housing, a hole is provided at the tip of said arm, and said microphone picks up sounds input from the hole at the tip of second end of the arm.

5. A headset according to claim 4, wherein a signal line connected to said microphone is disposed with predetermined looseness in said housing.

6. A headset according to claim 2, wherein said microphone is attached to the second end of said arm pulled out of the hole of said housing to the outside, and a signal line connected to the microphone is disposed inside a hollow arm.

7. A headset according to claim 2, wherein a switch which mutes the output of said microphone while said arm is accommodated in said housing is provided.

8. A headset according to claim 2, wherein said arm is constructed of shape-memory alloy and made to have a predetermined shape when pulled out of said housing.

9. A headset according to claim 1, wherein an anti-turning mechanism, in which the arm-attaching member is locked on said housing side at a predetermined position where the second end of said arm is pulled out to the outside of said housing, is provided.

10. A headset according to claim 1, wherein said arm is accommodated in said housing approximately linearly from the hole of the housing.

11. A headset according to claim 1, wherein a second housing worn on the wearer's another auricle is provided, and a driver unit which outputs a sound is provided in the second housing without providing an arm nor a microphone.

12. A headset according to claim 11, wherein a band for connecting said two housings is provided.

* * * * *